United States Patent Office 3,840,581
Patented Oct. 8, 1974

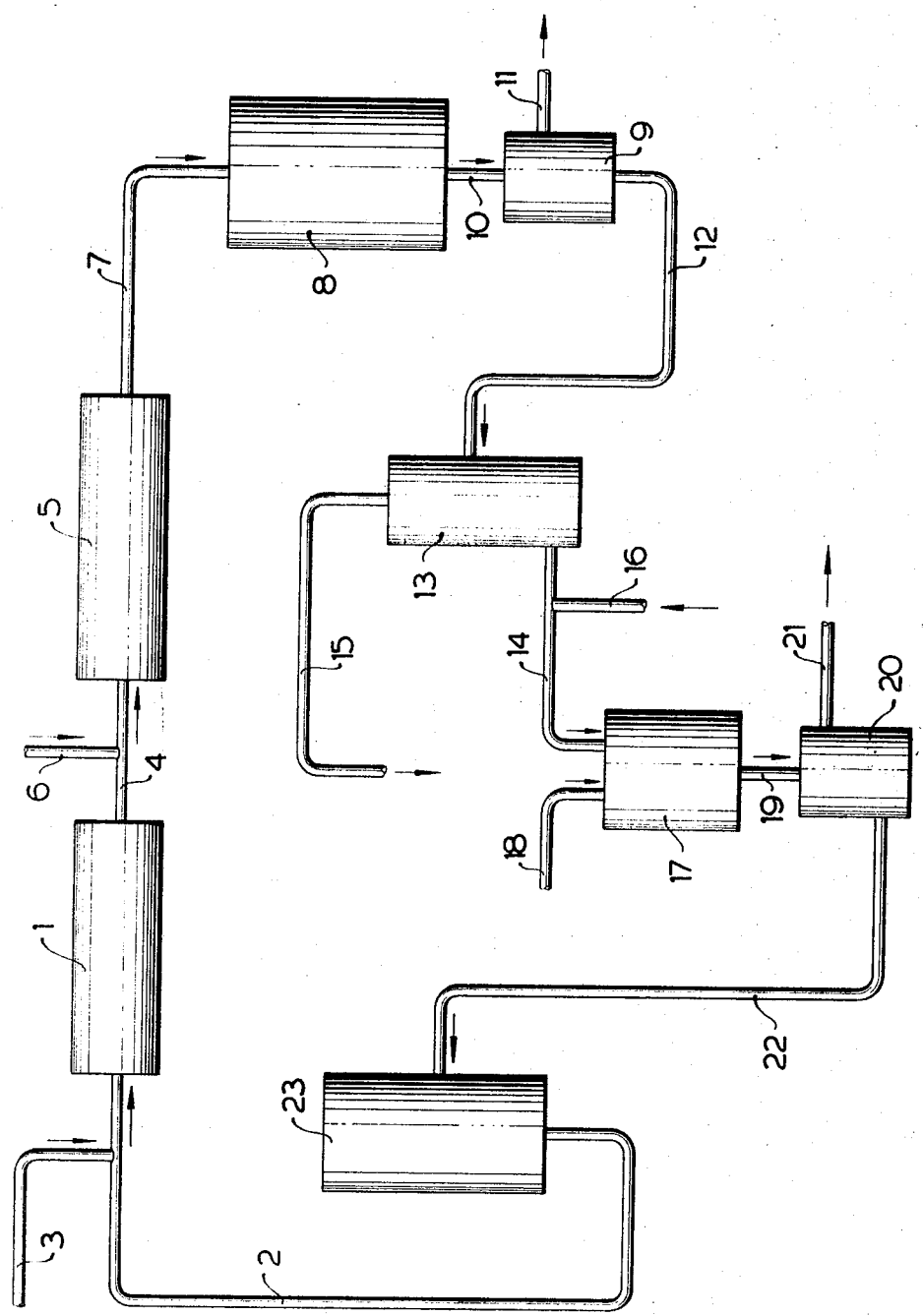

3,840,581
PROCESS FOR THE MANUFACTURE OF NITRILOTRIACETONITRILE
Hubert Neumaier, Hurth-Knapsack, Wilhelm Vogt, Hurth-Efferen, Kurt Sennewald, Hurth-Hermulheim, Richard Schuller, Cologne-Holweide, and Gunther Lenz, Frechen-Bachem, Germany, assignors to Knapsack Aktiengesellschaft, Knapsack, near Cologne, Germany
Continuation-in-part of abandoned application Ser. No. 133,978, Apr. 14, 1971. This application May 26, 1972, Ser. No. 257,258
Claims priority, application Germany, May 26, 1970, P 20 25 632.0; May 29, 1971, P 21 26 881.5
Int. Cl. C07c 121/02, 121/28
U.S. Cl. 260—465.5 A            2 Claims

ABSTRACT OF THE DISCLOSURE

Improved process for the manufacture of nitrilotriacetonitrile by reacting a salt of ammonia and a non-oxidizing acid with formaldehyde and hydrogen cyanide in an aqueous acid phase. The acid and the excess proportion of the ammonium salt introduced together with the starting materials into the reaction are recovered by introducing the aqueous acid phase freed from nitrilotriacetonitrile, or the mother liquor, into an evaporator, in which substantially between 50 and 75 weight percent of the water contained in the mother liquor, is evaporated. The resulting liquid and acid evaporation residue is treated with ammonia so as to establish a pH-value of at most 6 therein, oily by-products, which may be found to precipitate, are separated therefrom, and the mother liquor saturated with the ammonium salt is returned to the primary reaction zone.

---

The present application is a continuation-in-part application of application Ser. No. 133,978 filed Apr. 14, 1971, now abandoned, by Neumaier et al., and relates to an improvement in or modification of the process described in the parent application, wherein nitrilotriacetonitrile is produced, preferably in continuous fashion, by the reaction of an ammonium salt with formaldehyde and hydrocyanic acid, in an acid medium.

Patent application S.N. 133,978, now abandoned, describes a process for the manufacture of nitrilotriacetonitrile by reacting a salt of ammonia and a non-oxidizing acid with formaldehyde and hydrogen cyanide in an aqueous acid phase, at elevated temperature, completing the reaction and separating the reaction mixture into firstly crystalline nitrilotriacetonitrile and secondly an aqueous acid phase as the mother liquor, which comprises subjecting a product obtained by primary reaction of an aqueous ammonium salt solution with an aqueous formaldehyde solution, the said ammonium salt and the said formaldehyde being used in a ratio larger than 1:6, to reaction with a stoichiometric proportion of an aqueous hydrogen cyanide solution, the said stoichiometric proportion being based on the formaldehyde concentration of the said primary reaction product.

Particularly advantageous use can be made of the process for the continuous production of nitrilotriacetonitrile by the steps comprising continuously supplying a preliminary reactor with an aqueous solution of the ammonium salt and an aqueous solution of formaldehyde, the ammonium salt being used in a stoichiometric excess between 5 and 40 percent over the formaldehyde; thoroughly mixing the said aqueous solution components and reacting them inside the said reactor at a temperature between about 50 and 110° C. and within a period between about 2 seconds and 4 minutes; delivering the resulting reaction product to a second reactor series-connected to said preliminary reactor and reacting the said reaction product in said second reactor with a stoichiometric proportion of hydrogen cyanide in an aqueous acid phase, for a period of at least 3 minutes, under a pressure between 3 and 25 atmospheres (gauge) and at the temperature necessary to liquefy the resulting nitrilotriacetonitrile; cooling the reaction mixture in the said second reactor with pressure relief down to atmospheric pressure and precipitating the nitrilotriacetonitrile therefrom, and isolating the nitrilotriacetonitrile from the aqueous phase.

A preferred embodiment of this process comprises using a substantially saturated aqueous ammonium salt solution and an aqueous methanol-free formaldehyde solution with a strength between about 20 and 55 weight percent, the ammonium salt being preferably used in a stoichiometric excess between about 15 and 20 percent. The useful ammonium salts preferably include those of sulfuric acid, phosphoric acid or hydrochloric acid. The reaction takes place under very mild conditions, with reference to the formation of by-products, if use is made of reaction temperatures between about 60 and 70° C. coupled with an about 1–2 minute sojourn time of the reaction components, in the preliminary reactor.

The reaction in the second reactor, which is series-connected to the preliminary reactor, is preferably effected with the use of liquid hydrogen cyanide, or with the use of an aqueous solution having a strength of at least about 40 weight percent, the reactor being preferably maintained under a pressure between about 10 and 15 atmospheres (gauge) and at a temperature between about 90 and 110° C. While the sojourn time of the reaction mixture in the second reactor is not as critical as that in the preliminary reactor, as regards by-product formation, the fact remains that the reaction mixture increasingly undergoes undesirable yellow or brown coloration in the case of unnecessarily long sojourn times in the second reactor. To avoid this, the sojourn time in the second reactor should preferably be limited to a period between about 3 and 20 minutes, more preferably 6 and 10 minutes.

Following termination of the reaction, the nitrilotriacetonitrile is isolated. To this end, the reaction mixture is taken from the second reactor and quenched by cooling it down to a temperature between about 20 and 30° C. wth pressure relief down to atmospheric pressure, whereby the nitrile is precipitated from the reaction mixture. The nitrile may be isolated by subjecting the reaction mixture to filtration or centrifugation. Following this, the nitrile may be water-washed, if necessary or convenient, and it is dried.

A further embodiment of the process described in the aforesaid Patent Application Ser. No. 133,978 comprises recovering the excess proportion of the ammonium salt used as well as the acid set free during the reaction, the acid being first transformed into its ammonium salt, and recycling the recovered components to the preliminary reactor. The excess proportion of the ammonium salt introduced into the reactor together with the starting materials, as well as the ammonium salt of the acid set free during the reaction, are recovered by mixing the aqueous phase freed from nitrilotriacetonitrile with a substantially equal proportion by volume of a saturated aqueous formaldehyde solution, which is the same as that used as starting material, and treating the resulting mixture under vacuum to evaporate water therefrom in a quantity by volume, which is substantially the same as that introduced into the process together with the starting materials and that formed in the process as reaction water. The liquid acid evaporation residue is treated with ammonia so as to establish a pH-value of at most 6, preferably 3 to 5, ammonium salt which commences to precipitate from the evaporation residue is separated therefrom, made into a suitable aqueous solution and then recycled to the preliminary reactor. The aqueous evaporation residue freed from solid ammonium salt is further freed from oily by-products originating from the reaction, and the remaining aqueous proportion is introduced together with fresh mother liquor freed from nitrilotriacetonitrile, into the evaporator.

Reactors (preliminary and second reactors) very suitable for use in carrying out the process of the present invention include tubular coils, pipes or plate heat exchangers made up of chrome-nickel steel, nickel-molybdenum alloys or enamelled steel, of given dimensions.

The present invention now provides a simplified variant of the process described in aforesaid Patent Application Ser. No. 133,978, which enables energy economies to be effected and nitrilotriacetonitrile to be produced under commercially more attractive conditions.

The process of the present invention for the manufacture of nitrilotriacetonitrile in accordance with Patent Application Ser. No. 133,978 by reacting a salt of ammonia and a non-oxidizing acid with formaldehyde and hydrogen cyanide in an aqueous acid phase, at elevated temperature, completing the reaction and separating the reaction mixture into firstly crystalline nitrilotriacetonitrile and secondly an aqueous acid phase as the mother liquor, wherein a product obtained by primary reaction of an aqueous ammonium salt solution with an aqueous formaldehyde solution in a molar ratio larger than 1:6, is subjected to reaction with a stoichiometric proportion of an aqueous hydrogen cyanide solution, based on the formaldehyde concentration of the said primary reaction product, comprises more particularly recovering the acid and the excess proportion of the ammonium salt introduced together with the starting materials into the reaction by introducing the aqueous acid phase freed from nitrilotriacetonitrile, or the mother liquor, into an evaporator, evaporating therein substantially between 50 and 75 weight percent of the water contained in the mother liquor, treating the resulting liquid and acid evaporation residue with ammonia so as to establish a pH value of at most 6 therein, separating oily by-products, which may be found to precipitate, therefrom, and returning the mother liquor saturated with the ammonium salt to the primary reaction zone.

A preferred embodiment of the present process comprises evaporating substantially 70 weight percent of the water contained in the mother liquor, and a further preferred embodiment comprises establishing a pH value between 3 and 4 in the evaporation residue by the addition of ammonia. The mother liquor saturated with ammonium salt generally contains the ammonium salt in a concentration between about 30 and 35 weight percent.

As compared with the process described in Patent Application Ser. No. 133,978, the improved process of the present invention is not only easier to carry out, it also provides significant commercially beneficial effects, which firstly reside in less expenditure of machinery and secondly in the non-circulation of the saturated ammonium salt solution, whereby energy economies are effected. Despite the simplified process of the present invention, which, however, provides for the separation of undesirable oily by-products, the resulting product has a purity equating that of the product obtained in aforesaid Patent Application Ser. No. 133,978.

An exemplary embodiment of the process of the present invention will now be described with reference to the accompanying flow scheme.

Preliminary reactor 1, which is fitted with a heating jacket and may be a tubular coil reactor, for example, is fed continuously with an aqueous ammonium sulfate solution travelling through conduit 2, and with an aqueous formaldehyde solution travelling through conduit 3. The two solutions are intimately mixed together and reacted in reactor 1 at a temperature between about 50 and 110° C., within a period between 2 seconds and 4 minutes. The reaction mixture produced in preliminary reactor 1 is delivered through conduit 4 to second reactor 5 which is series-connected to reactor 1. In reactor 5, the reaction mixture coming from reactor 1 is further reacted, with thorough agitation, with hydrogen cyanide in an aqueous acid phase, under a pressure between 3 and 25 atmospheres (gauge) and at the temperature necessary to liquefy resulting nitrilotriacetonitrile, for a period of at least 3 minutes. The hydrogen cyanide is fed through conduit 6 to reactor 5 which has a shape approaching that of reactor 1. The reaction mixture is taken from reactor 5 through conduit 7, and nitrilotriacetonitrile is isolated therefrom by cooling the reaction mixture in crystallizer 8 with pressure relief down to atmospheric pressure. This effects precipitation of the nitrile from the aqueous phase. The precipitated nitrile is delivered to separator 9, which communicates with crystallizer 8 through line 10, isolated therein by filtration or centrifugation, and removed through conduit 11. Aqueous mother liquor, which accumulates in separator 9, contains the excess proportions of ammonium sulfate together with sulfuric acid originating from the reaction, and minor proportions of organic by-products. The sulfuric acid and ammonium sulfate in excess are recovered by introducing the mother liquor through conduit 12 into evaporator 13, in which the quantity of water necessary to obtain a substantially saturated ammonium sulfate solution—this following neutralization later of the concentrate—is evaporated under vacuum. Between about 50 and 75 weight percent of the total water introduced together with the starting materials into the reaction and formed therein as reaction water have to be evaporated. Water evaporating at the head of evaporator 13 is removed through conduit 15. The liquid acid evaporation residue travels through conduit 14 to neutralization vessel 17. Conduit 16 is used to supply fresh sulfuric acid for the compensation of minor losses of such acid, which may be found to occur. Ammonia travelling through conduit 18 is introduced into neutralization vessel 17 whereby the acid concentrate is adjusted to a pH-value of at most 6. This effects the transformation of the sulfuric acid into ammonium sulfate and the simultaneous precipitation of minor proportions of an oily phase. The separation of said phase is effected only after repeated circulation, namely when the concentrated ammonium sulfate solution is found to have been saturated with organic by-products, and a concentration between 33 and 35 weight percent of ammonium sulfate is found to have been established. The ammonium sulfate solution coming from neutralization vessel 17 is delivered to separator 20, through line 19. By-products separated in separator 20 are removed therefrom through line 21, whereas the ammonium sulfate solution freed from oily constituents is conveyed through conduit 22 to intermediate container 23 and further delivered through conduit 2 to preliminary reactor 1, according to requirements.

EXAMPLE 27 kg. of an aqueous formalin solution having a strength of 30 weight percent, which travelled through conduit 3, and 20 kg. of an aqueous ammonium sulfate solution having a strength of 34.5 weight percent, which came from reservoir 23 and travelled through conduit 2, were supplied, per hour, to preliminary reactor 1. The formaldehyde and ammonium sulfate were used in the molar ratio of 3:0.58. Preliminary reactor 1 was maintained at a temperature of 60° C. and under a pressure of substantially 12 atmospheres gauge. The preliminary reactor was a heated tubular coil which had a diameter of 15 mm., a length of 7.7 meters and a volume of 1.36 liters. The sojourn time of the reaction components in preliminary reactor 1 was approximately 2 minutes. The reaction mixture coming from preliminary reactor 1 was mixed, per hour, with 8.1 kg. of an aqueous hydrogen cyanide solution with a strength of 90 weight percent, and the resulting mixture was delivered to reactor 5 series-connected to reactor 1.

Reactor 5 equally was a heated tubular coil which had a diameter of 15 mm., a length of 38.5 meters and a volume of 6.8 liters. The temperature in reactor 5 was 100° C. and the pressure substantially 10 atmospheres gauge. The reaction mixture contained hydrogen cyanide and formaldehyde in the molar ratio of 1:1 and was allowed to remain in reactor 5 for a period of about 8 minutes. Following completion of the reaction and relief of pressure, the hot reaction mixture produced in reactor 5 was conveyed to water-cooled crystallizer 8 which was fitted with an agitator and contained a crystal mash originating from the process. In crystallizer 8, the nitrilotriacetonitrile—briefly termed NTN hereinafter—was precipitated in the form of fine crystals. The nitrile-containing mash was centrifuged in separator 9. The resulting crystalline nitrile was water-washed, this conditional upon the purity desired to be produced, and may be dried, if desired.

Mother liquor, substantially 43–44 kg./hr., coming from separator 9, was delivered to circulation evaporator 13, in which between about 24 and 25 kg. of water were evaporated per hour at 55–60° C. and under a pressure of 120–150 mm. of mercury. This substantially corresponded to 70 weight percent of the total water introduced together with the starting solutions into the process and formed during the reaction to produce NTN. The sulfuric acid-mother liquor coming from evaporator 13 was agitated and treated with gaseous ammonia in water-cooled neutralization vessel 17 so as to establish a pH-value between 3 and 4, and a minor proportion of a dark brown oily phase commenced to precipitate. In separator 20 placed downstream of neutralization vessel 17, the oily phase was separated from the aqueous ammonium salt solution, which was returned to preliminary reactor 1 via intermediate container 23. The oil, which was obtained substantially at the rate of 0.6–0.8 kg./hr., was destroyed.

11.0–11.16 kg. of NTN were obtained per hour for a conversion rate of 98 percent. The NTN-yield accordingly was 91.2–92.5%, based on the quantity of HCN or $CH_2O$ used, or 93.1–94.5%, based on the hydrogen cyanide or formaldehyde which underwent conversion. The NTN melted at 128° C. A 10% solution of NTN in nitromethane could not be found by hydrogen nuclear magnetic resonance spectroscopy to contain impurities.

We claim:

1. In the process for the manufacture of nitrilotriacetonitrile by reacting an ammonium salt of sulfuric acid, phosphoric acid or hydrochloric acid with an aqueous formaldehyde solution having a strength of between about 20 and 55 weight percent and liquid hydrogen cyanide or an aqueous solution thereof, having a strength of at least 40 weight percent, at a temperature of between about 50 and 110° C., wherein
   (a) a preliminary reactor is continuously supplied with a substantially saturated aqueous solution of the ammonium salt and the aqueous methanol-free formaldehyde solution, which are preheated at a temperature of between about 50 and 110° C., the ammonium salt being used in a stoichiometric excess between 5 and 40 percent over the formaldehyde;
   (b) the said aqueous solution components are thoroughly mixed and reacted inside the said preliminary reactor at a temperature of between about 50 and 110° C. and within a period of between about 2 seconds and 4 minutes;
   (c) the resulting reaction product is delivered to a second reactor series-connected to the said preliminary reactor and the said reaction product is reacted in the said second reactor with a stoichiometric proportion, based on the amount of the formaldehyde, of liquid hydrogen cyanide or with the aqueous solution thereof, for a period between about 3 and 10 minutes, under a pressure between 3 and 25 atmospheres gauge and at a temperature between about 90 and 110° C., with the resultant formation of nitrilotriacetonitrile and the free acid (formed in situ) of the ammonium salt;
   (d) the reaction mixture is withdrawn from the said second reactor and quenched by cooling it down to a temperature between about 20 and 30° C. with pressure relief to atmospheric pressure and separated by filtration or centrifugation into firstly crystalline nitrilotriacetonitrile and secondly an aqueous acid mother liquor containing substantially the said excess ammonium salt and the free acid of the ammonium salt, the improvement which comprises, recovering the acid of the ammonium salt and the excess proportion of the ammonium salt from the aqueous mother liquor by introducing the mother liquor into an evaporator, evaporating therein substantially between 50 and 75 weight percent of the water contained in the mother liquor, treating the resulting concentrated mother liquor with ammonia so as to establish a pH-value of between 3 and 4 therein with the resultant formation of an aqueous ammonium salt solution containing the ammonium salt in a concentration between about 30 and 35 weight percent, separating oily by-products, which may be found to precipitate, therefrom, and recycling the ammonium salt solution to the preliminary reactor.

2. The process as claimed in claim 1, wherein 70 weight percent of the water contained in the mother liquor is evaporated.

References Cited

UNITED STATES PATENTS

| 3,337,607 | 8/1967 | Wollensak | 260—465.5 A |
| 3,679,729 | 7/1972 | Daniels | 260—465.5 A |
| 3,637,799 | 1/1972 | Herz | 260—465.5 A |
| 3,546,271 | 12/1970 | Harris | 260—465.5 A |
| 3,463,805 | 8/1969 | Morgan et al. | 260—465.5 A |

FOREIGN PATENTS

| 1,115,980 | 6/1968 | Great Britain | 260—465.5 A |

JOSEPH PAUL BRUST, Primary Examiner